US005321086A

United States Patent [19]

Kozakura et al.

[11] Patent Number: 5,321,086

[45] Date of Patent: Jun. 14, 1994

[54] POLYCARBONATE RESIN COMPOSITION

[75] Inventors: Shiro Kozakura; Takashi Komatsu, both of Ichihara, Japan

[73] Assignee: Idemitsu Petrochemical Co., Ltd., Tokyo, Japan

[21] Appl. No.: 955,889

[22] PCT Filed: Apr. 21, 1992

[86] PCT No.: PCT/JP92/00511

§ 371 Date: Dec. 1, 1992

§ 102(e) Date: Dec. 1, 1992

[87] PCT Pub. No.: WO92/18571

PCT Pub. Date: Oct. 29, 1992

[30] Foreign Application Priority Data

Apr. 22, 1991 [JP] Japan ................ 3-090465
Apr. 22, 1991 [JP] Japan ................ 3-090756
Apr. 22, 1991 [JP] Japan ................ 3-090758

[51] Int. Cl.$^5$ ............................................ C08L 69/00
[52] U.S. Cl. ........................... 525/147; 525/146; 525/148; 525/433; 525/439
[58] Field of Search ............. 525/146, 147, 433, 439

[56] References Cited

U.S. PATENT DOCUMENTS 3,751,400  8/1973  Crennan ................ 528/202
5,030,675  7/1991  Wittmann ............... 525/147
5,185,425  2/1993  Komatsu ................ 528/202

FOREIGN PATENT DOCUMENTS 0119531  9/1984  European Pat. Off. .
0149190  7/1985  European Pat. Off. .
0296504  12/1988  European Pat. Off. .
0311008  4/1989  European Pat. Off. .
46-40715  12/1971  Japan .
30255  3/1976  Japan .
25467  2/1980  Japan .
59-196360  11/1984  Japan .
60-170662  9/1985  Japan .
190252  8/1987  Japan ................ 525/147
62-243640  10/1987  Japan .
64-79227  3/1989  Japan .
1-95154  4/1989  Japan .
57-108152  7/1992  Japan .
1163816  9/1969  United Kingdom .

Primary Examiner—David Buttner
Attorney, Agent, or Firm—Frishauf, Holtz, Goodman & Woodward

[57] ABSTRACT

A polycarbonate resin composition which comprises (a) a polycarbonate containing a repeating unit (I) derived from tetrahalogenobisphenol A and a repeating unit (II) derived from bisphenol A and trihalogenophenoxy groups bonded at the terminals, and (b) at least one thermoplastic resin selected from the group consisting of (i) a polyamide resin selected from the group consisting of nylon 6 and nylon 6,6, (ii) a thermoplastic polyester selected from the group consisting of polyethylene terephthalate and polybutylene terephthalate and (iii) a polyolefin. The polycarbonate resin composition has desirable physical properties including desirable mechanical properties, moldability, heat resistance, flame retardance, thermostability, rigidity, impact resistance, solvent resistance, and fluidity, and can be used to make parts for automobiles, home electric appliances, and office automation appliances.

6 Claims, No Drawings

POLYCARBONATE RESIN COMPOSITION

DESCRIPTION

1. Technical Field

The present invention relates to a polycarbonate resin composition, and more particularly to a polycarbonate resin excellent in physical properties such as mechanical strength, moldability, heat resistance, flame retardance, thermostability, rigidity, impact resistance, solvent resistance, and fluidity, which comprises a polycarbonate having a novel structure and a polyamide resin, a thermoplastic polyester or a polyolefin.

2. Background Arts

As halogen-containing carbonate copolymers, various ones have heretofore been proposed. For example, (i) a copolymer of tetrabromobisphenol A (TBA) and bisphenol A (BPA) (Japanese Patent Publication No. 24660/1972), (ii) a copolymer of tetrabromobisphenol-sulfone (TBS) and BPA (Japanese Patent Application Laid-Open No. 123294/1976), (iii) a copolymer of tetrabromothiodiphenol (TBTDP) and BPA (Japanese Patent Application Laid-Open No. 99226/1981), (iv) a copolymer of the statistic mixture of halogenated bisphenol and BPA (Japanese Patent Application Laid-Open No. 136796/1976), and a blend of a copolymer of thiodiphenol (TDP) and BPA with the copolymer of (i) above (Japanese Patent Application Laid-Open No. 50065/1979) have been known.

These copolymers are obtained by copolymerization of halogenated bisphenols which result from substitution of hydrogens, with halogens, of the benzene nucleuses of bisphenols, for the purpose of giving bisphenols a sufficient amount of halogens for providing flame retardance. In any of these copolymers, however, these halogenated bisphenols must be used in a comparatively large amount. This is attended with a problem that the mechanical strength (particularly impact strength) of said polycarbonate must be sacrificed.

Besides the above, a halogen-containing polycarbonate in which halogenated phenol is used as the terminal stopper has been known (Japanese Patent Publication No. 40715/1971).

As an improvement of the above-described defects, a polycarbonate produced by copolymerization of BPA, TBA and TDP has been known (Japanese Patent Application Laid-Open No. 140597/1977). According to said process, the resulting polycarbonate is provided with both of flame retardance and mechanical strength, but not necessarily with sufficient moldability.

In this connection, one of the present inventors has recently succeeded in developing a polycarbonate having a novel structure which is greatly improved in flame retardance, and is excellent in thermostability at molding while maintaining a sufficient mechanical strength and optical properties (Japanese Patent Application Laid-Open No. 200833/1991).

However, said novel polycarbonate was found to have a problem in molding and processing because of its high melt viscosity, though it has superior physical properties to those of conventional polycarbonates.

DISCLOSURE OF THE INVENTION

Under these circumstances, the present inventors have repeated intensive studies to overcome the above problems while maintaining the advantages of the novel polycarbonate as described above.

As a result, it was found that the novel polycarbonate can be greatly improved in fluidity, impact resistance, and solvent resistance by blending a thermoplastic resin including polyamide resin, thermoplastic polyester, and polyolefin, while maintaining the mechanical properties possessed by the conventional polycarbonates. The present invention has been accomplished based on such a finding.

The present invention provides a polycarbonate resin composition which comprises (a) a polycarbonate having a repeating unit (I) represented by the general formula (A):

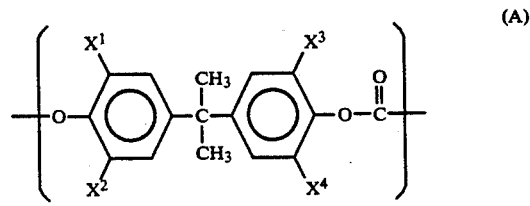

wherein, $X^1$ to $X^4$ are independently a halogen atom, a repeating unit (II) represented by the formula (B):

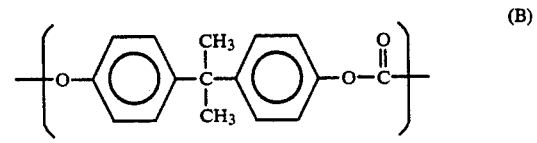

and, at the terminal thereof, a trihalogenophenoxy group represented by the general formula (C):

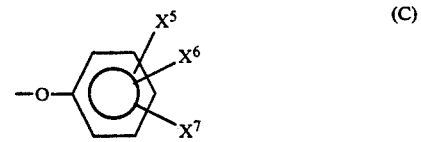

wherein $X^5$ to $X^7$ are independently a halogen atom, and (b) at least one thermoplastic resin selected from the group consisting of (i) polyamide resin, (ii) thermoplastic polyester, and (iii) polyolefin.

BEST MODE FOR CARRYING OUT THE INVENTION

The composition of the present invention comprises as the main ingredients (a) a polycarbonate and (b) a thermoplastic resin, that is, specifically, (i) polyamide resin, (ii) thermoplastic polyester or (iii) polyolefin, or a mixture thereof, as described above.

Herein polycarbonate as component (a) comprises a repeating unit (I) represented by the general formula (A) and a repeating unit (II) described above.

$X^1$ to $X^4$ in the general formula (A) indicate independently a halogen atom such as bromine atom, chlorine atom, and fluorine atom. $X^1$ to $X^4$ may be identical or different, but usually identical.

In said polycarbonate, a trihalogenophenoxy group represented by the general formula (C) is bonded at the terminal, particularly both the terminals of the molecule. $X^5$ to $X^7$ in the general formula (C) also indicate independently a halogen atom such as bromine atom, chlorine atom, and fluorine atom, as in above-mentioned $X^1$ to $X^4$. $X^1$ to $X^4$ in the repeating unit (I) and $X^5$ to $X^7$ in the general formula (C) may be identical or different.

In the above polycarbonate, as for the mole fractions of the repeating unit (I) and the repeating unit (II), the content of the repeating unit (I) in the main chain should be 1 to 10 mol %, preferably 2 to 6 mol %. If the content of the repeating unit (I) in the main chain is less than 1% by weight, flame retardance of the resulting product is poor, while if it is in excess of 10 mol %, the mechanical strength of the product comes out low.

As for the polymerization degree of the above-mentioned polycarbonate, its viscosity average molecular weight is preferably in the range of 10,000 to 50,000. If the viscosity average molecular weight is less than 10,000, the mechanical strength including impact resistance is not sufficient.

The above-mentioned polycarbonate has the repeating units (I) and (II), and trihalogenophenoxy groups represented by the general formula (C) bonded at the terminals thereof. The polycarbonate may be any of random copolymer, block copolymer, and alternating copolymer.

Said polycarbonate may contain a small amount of a repeating unit or repeating units other than the repeating units (I) and (II) in the molecular chain thereof.

The third copolymers which constitute such a repeating unit or repeating units other than the repeating units (I) and (II) include bisphenolsulfone (BPS) and TDP. The content (molar fraction) thereof should be 0 to 20 mol %, preferably 0 to 10 mol % based on the total amount of BPA and TBA. If the content is in excess of 20 mol %, the mechanical strength of the product is low.

Various methods can be employed for producing the composition of the present invention, but preferable ones are the following two methods.

According to the first method, an aqueous alkali solution (such as an aqueous solution of sodium hydroxide, potassium hydroxide, and sodium carbonate) of tetrahalogenobisphenol A (such as tetrabromobisphenol A, tetrachlorobisphenol A, and tetrafluorobisphenol A) represented by the general formula (A'):

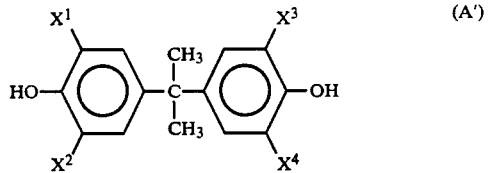
(A')

wherein $X^1$ to $X^4$ are as defined above, an aqueous alkali solution of bisphenol A (BPA) represented by the formula (B'):

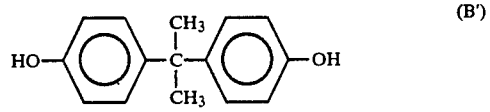
(B')

and an aqueous alkali solution of trihalogenophenol (such as tribromophenol, trichlorophenol, and trifluorophenol) represented by the general formula (C'):

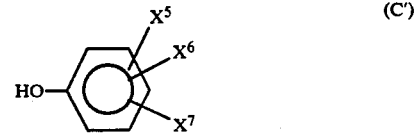
(C')

wherein $X^5$ to $X^7$ are as defined above, with a solvent such as methylene chloride, chlorobenzene, pyridine, chloroform, and carbon tetrachloride, and a catalyst such as triethylamine and trimethylbenzylammonium chloride are mixed in a predetermined ratio and stirred, and then phosgene is blown into the mixture to perform interfacial polymerization. The reaction system is preferably cooled with water or ice, because the reaction is exothermic. It is also preferable that the pH of the reaction system be maintained at 10 or more by adding an alkali while measuring with a pH meter since the reaction system becomes acidic as the reaction proceeds.

A part (not more than 50 mol %) of trihalogenophenol can be replaced by a monohydric phenol such as p-tert-butylphenol and phenol, and may be used in combination. In the polycondensation reaction, the tetrahalogenobisphenol A of the formula (A') constitutes the repeating unit (I), and the bisphenol A of the formula (B') constitutes the repating unit (II) in the resulting polycarbonate. Accordingly, the ratio of the tetrahalogenobisphenol A and bisphenol A to be initially placed is determined appropriately depending on the mole fraction of the repeating units (I) and (II) and the proportion of halogen atoms to be contained in the polycarbonate to be produced. The amounts of trihalogenophenol and phosgene define the polymerization degree of each the repeating unit (I) and (II), and the polymerization degree of total polycarbonate, and consequently the molecular weight of the polycarbonate. Accordingly, the amounts of trihalogenophenol and phosgene to be introduced are determined according to the object. In blowing phosgene, the amount of phosgene blown per hour is controlled so that the total amount of phosgene blown until the reaction is completed is equal to the necessary amount of phosgene to be supplied.

When the reaction mixture thus obtained is introduced into a large amount of a precipitating agent including methanol, the polycarbonate as component (a) of the composition of the present invention is precipitated out.

In the above reaction, various carbonate-forming derivatives such as bromophosgene, diphenyl carbonate, di-p-tolyl carbonate, phenyl p-tolylcarbonate, di-p-chlorophenyl carbonate, dinaphthyl carbonate, and the like can be used in place of phosgene.

In accordance with the second method, a polycarbonate oligomer is first prepared from bisphenol A and phosgene in advance. With said polycarbonate oligomer, an aqueous alkali solution of tetrahalogenobisphenol A and an aqueous alkali solution of trihalogenophenol, a solvent capable of dissolving said oligomer such as methylene chloride, a catalyst such as triethylamine and trimethylbenzylammonium chloride are mixed in a predetermined ratio and stirred as the prepolymerization. Subsequently, an aqueous alkali solution of bisphenol A and, if desired, p-tert-butylphenol are added to make the polycondensation reaction proceed. The reaction product is then poured into a large amount of a precipitating agent such as methanol to precipitate the polycarbonate as component (a).

The polycarbonate as component (a) of the composition of the present invention can be efficiently produced according to the above-mentioned process. Besides the above, effective methods are (i) a method in which a polycarbonate oligomer is previously prepared from tetrahalogenobisphenol A and phosgene, and the oligomer is reacted with bisphenol A and trihalogenophenol in the presence of a solvent, an aqueous alkali solution, and catalyst which are suitable for the reaction, (ii) a method in which a polycarbonate oligomer prepared from bisphenol A (or tetrahaloenobisphenol A) and phosgene is reacted with tetrahalogenobisphenol A (or bisphenol A) and trihalogenophenol in the presence of a solvent, an aqueous alkali solution, a catalyst which are suitable for the reaction, and phosgene is blown in the course of reaction, and (iii) a method in which a polycarbonate oligomer is prepared from bisphenol A and phosgene, and a polycarbonate oligomer is prepared from tetrahalogenobisphenol A and phosgene previously, and these polycarbonate oligomers are reacted in the presence of trihalogenophenol, a solvent, an aqueous alkali solution, and a catalyst which are suitable for the reaction. (iv) In the above methods, a multi-stage polymerization in which polymerization is carried out at two or more stages is effectively employed.

The polycarbonate mentioned above can be obtained by any of these methods.

The polycarbonate as component (a) of the composition of the present invention has a viscosity average molecular weight of 10,000 to 50,000, preferably 13,000 to 50,000 as mentioned before. The viscosity average molecular weight can be controlled to that range by selecting the amount of trihalogenophenol to be used mainly as the molecular weight controlling agent. Usually, trihalogenophenol is used therein in the amount ratio of 0.01 to 0.1 times (mol) as large as that of the diphenols which constitutes the main chain.

In adding catalysts such as BPA, an aqueous alkali solution and triethylamine to polycarbonate oligomer to prepare polycarbonate by interfacial polycondensation, the amount of the catalyst to that of the diphenols should be usually in the range of 0.0005 to 0.03 (mol/mol).

In preparation of polycarbonate by interfacial polycondensation by adding a catalyst such as BPA, an aqueous alkali solution, and triethylamine to polycarbonate oligomer, the amount of caustic soda to be used should be usually in the range of 0.1 to 5.0 (mol/mol) as the ratio of caustic soda/diphenols.

Among the thermoplastic resins as component (b) which constitutes the composition of the present invention, (i) polyamide resin is not particularly limited, but various kinds of polyamide resins can be used depending on the uses. For example, all of an open-ring polymer of lactam, polycondensate of diamine and dibasic acid, and a polycondensate of δ-amino acid can be used, and also mixtures of these polymers, and copolymer thereof can be used. Specific example of them are Nylon-6 (PA-6), Nylon-6·6 (PA-6·6), Nylon-6·10, Nylon-6·12, Nylon-11, Nylon-12, and Nylon-6/6·6 copolymer.

One of the composition of the present invention comprises, as described above, a polycarbonate as component (a) and (i) polyamide resin as component (b) as the main components. The proportion of these two components may be selected from the range where the proportion of polycarbonate as component (a) is 30 to 99% by weight, preferably 50 to 95% by weight, and the proportion of (i) polyamide resin is 70 to 1% by weight, preferably 50 to 5% by weight. If the proportion of polycarbonate as component (a) exceeds 99% by weight, the resulting composition cannot obtain sufficient fluidity and solvent resistance. If it is less than 30% by weight, flame retardance of the composition does not reveal sufficiently.

Among thermoplastic resins as component (b) which constitutes the composition of the present invention, various ones can be used as the (ii) thermoplastic polyester. Particularly, polyester resins obtained by polymerization of bifunctional carboxylic acid component and alkylene glycol component is preferred.

Herein examples of bifunctional carboxylic acid component and alkylene glycol component are as follows. As bifunctional carboxylic acid components, aromatic dicarboxylic acids such as terephthalic acid, isophthalic acid, and naphthalene dicarboxylic acid can be mentioned. Among these, terephthalic acid is preferred, and other bifunctional carboxylic acids can be used in combination so far as the effect of the present invention is not impaired. These are, for example, aliphatic dicarboxylic acids such as oxalic acid, malonic acid, adipic acid, suberic acid, azelaic acid, sebacic acid, and decanedicarboxylic acid, and ester-forming derivatives thereof.

Preferable proporation of these dicarboxylic acid components other than terephthalic acid is usually within 20 mol % of the total amount of dicarboxylic acid.

Alkylene glycol components therein are not particularly limited. Specifically, aliphatic diols containing 2 to 15 carbon atoms, such as ethylene glycol, propylene-1,2-glycol, propylene-1,3-glycol, butylene-1,4-glycol, butylene-2,3-glycol, hexane-1,6-diol, octane-1,8-diol, neopentyl glycol and decane-1,10-diol can be used. Among these, ethylene glycol and butylene glycol are suitable. Particularly preferable ones of these polyester resins are polyethylene terephthalate and polybutylene terephthalate.

The above-mentioned (ii) thermoplastic polyester can be produced by a usual method in the presence or absence of polycondensation catalyst containing titanium, germanium, antimony and the like. For example, polyethylene terephthalete is usually produced by the reaction as the first step where terephthalic acid and ethylene glycol are esterified, or lower alkyl ester of terephthalic acid such as dimethyl terephthalate and ethylene glycol are transesterified to produce glycol ester of terephthalic acid and/or the low polymer thereof; and by the reaction (polymerization reaction) as the second step where said glycol ester and/or the lower polymer thereof are further polymerized to obtain a polymer having a higher degree of polymerization.

Another embodiment of the composition of the present invention comprises, as described before, the polycarbonate as component (a) and (ii) thermoplastic polyester as component (b) as the main components. The proportions of these components can be selected from the range where the proportion of the polycarbonate as component (a) is 1 to 99% by weight, preferably 30 to 98% by weight, and the proportion of (ii) thermoplastic polyester is 99 to 1% by weight, preferably 70 to 2% by weight. If the proportion of the polycarbonate as component (a) is in excess of 99% by weight, the resulting composition cannot have sufficient fluidity and solvent resistance. On the other hand, if it is less than 1% by weight, the composition cannot exhibit a sufficient flame retardance.

Among the thermoplastic resins as component (b) constituting the composition of the present invention, (iii) polyolefins include homopolymers of α-olefins such as ethylene, propylene, butene-1, isobutene-1, pentene-1, 3-methylbutene-1, 4-methylpentene-1, hexene-1, octene-1 and the like; copolymers of two or more of these olefins; and copolymers of at least 70 mol %, preferably at least 80 mol % of these olefins and a vinyl compound (for example, a vinyl ester such as vinyl acetate; halogenated vinyl such as vinyl chloride, unsaturated carboxylic acids such as acrylic acid, methacrylic acid, and maleic acid; an unsaturated carboxylic acid ester such as methyl acrylate, ethyl acrylate, methyl methacrylate, and ethyl methacrylate).

Specifically, low density polyethylene, linear low density polyethylene (LLDPE), high density polyethylene (HDPE), isotactic polypropylene, atactic polypropylene, ethylene-propylene copolymer, ethylene-vinyl acetate copolymer and a saponified product thereof, ethylene-methyl acrylate copolymer, ethylene-ethyl acrylate copolymer, and ethylene-methyl methacrylate copolymer are mentioned.

Still another embodiment of the composition of the present invention comprises a polycarbonate as component (a) and a polyolefin as component (b) as the main components, as described before. The proportions of these two components can be selected from the range where the proportion of polycarbonate as component (a) is 50 to 99% by weight, preferably 70 to 95% by weight, and the proportion of (iii) polyolefin as component (b) is 50 to 1% by weight, preferably 30 to 5% by weight. If the proportion of polycarbonate as component (a) is in excess of 99% by weight, the resulting composition cannot have sufficient fluiudity and solvent resistance. If it is less than 50% by weight, the composition cannot exhibit sufficient flame retardance.

In the polycarbonate resin composition of the present invention, various inorganic fillers, additives or other synthetic resins, elastomers and the like can, if necessary, be blended so long as the purpose of the present invention is not impaired.

Inorganic fillers blended in order to improve the mechanical strength, the durability, or to increase the quantity of the polycarbonate resin composition include glass fibers (GF), glass beads, glass flakes, carbon black, calcium sulfate, calcium carbonate, calcium silicate, titanium oxide, alumina, silica, asbestos, talc, clay, mica, and quartz powder.

The aforementioned additives include an anti-oxidant of the hindered phenol type, the phosphorus type such as phosphite and the phosphate, and amine type; UV absorbers such as benzotriazoles, and benzophenones; external lubricating agents such as aliphatic carboxylates, and paraffines; mold release agents; antistatic agents; colorants and the like.

As the hindered phenol type anti-oxidizing agents, BHT (2,6-di-tert-butyl-p-cresol), Irganox 1076 and Irganox 1010 (trade name, produced by CIBA-GEIGY CO.), Ethyl 330 (trade name, produced by ETHYL CO.), Sumilizer GM (trade name, produced by SUMITOMO CHEMICAL CO., LTD.) and the like are preferably used.

As the other synthetic resins, polystyrene, acrylonitrilestyrene (AS) resin, acrylonitrile-butadiene-styrene (ABS) resin, poly(methyl methacrylate) and polycarbonates other than the above-mentioned polycarbonate can be mentioned. As elastomers, isobutylene-isoprene rubber, styrene-butadiene rubber, ethylene-propylene rubber, and acrylic elastomer are mentioned.

Examples of flame retardants are tetrabromobisphenol A (TBA), TBA oligomer, decabromobisphenol A, brominated epoxy compound, and the like. In addition, auxiliary flame retardants such as $Sb_2O_3$, sodium antimonate and the like can be used.

The polycarbonate resin composition of the present invention can be prepared by blending the above-mentioned components and kneading them. Blending and kneading can be conducted by a conventional method with the use of a ribbon blender, a Henschel mixer, a Bunbury mixer, a drum tumbler, a single-screw extruder, a twin-screw extruder, a co-kneader, a multi-screw extruder or the like. The kneading is appropriately conducted at a heating temperature usually in the range of 250° to 300° C.

The polycarbonate resin composition thus obtained can be molded by various conventional molding methods such as injection molding, extrusion molding, compression molding, calender molding, and rotary molding to prepare molded products such as parts for electric and electronic appliances, office automation appliances, and automobiles, particularly, material for rotating parts, transferring parts, and driving parts.

The present invention will be described in greater detail with reference to the following examples and comparative examples.

REFERENCE EXAMPLE

Preparation of Polycarbonate Oligomer of Bisphenol A

Into a 2-liter flask equipped with a stirrer, 91 g of bisphenol A (BPA), 330 ml of methylene chloride and 560 ml of a 2.0N aqueous solution of sodium hydroxide were introduced, and phosgene was blown thereinto for 70 minutes while the resulting mixture was being stirred and cooled on a water bath. The reaction mixture was allowed to stand still at room temperature, and then a methylene chloride solution of oligomer was separated out as a lower layer. The concentration of the oligomer in the oligomer solution was 320 g/l, the number average molecular weight of the oligomer was 850, and the concentration of the chloroformate group was 0.7 mol/l.

PREPARATION EXAMPLE 1

Preparation of PC-1

In a 50-liter reactor equipped with a stirrer, 10 l of polycarbonate oligomer prepared in the above Reference Example, 1.8 l of an aqueous alkali solution of TBA and tribromophenol (TBP) (consisting of 250 g (0.460 mol) of TBA, 150 g (0.453 mol), 78.6 g (1.96 mol) of sodium hydroxide, and 1.35 l of water) was placed, and stirred at 500 rpm. After 60 minutes, 3.9 l of a solution of BPA in an aqueous sodium hydroxide solution (457 g (2.00 mol) of BPA, 267 g (6.68 mol) of sodium hydroxide, and 3.42 l of water) and 6.1 l of methylene chloride were added, and the resulting mixture was stirred.

After 60 minutes' stirring, the reaction mixture was separated into an aqueous layer and a methylene chloride layer which contains the copolymer formed.

The methylene chloride layer was washed with water, and acid (0.1N hydrochloric acid) and then with water. From the methylene chloride layer, methylene chloride was removed at 40° C. under reduced pressure to obtain a white powder (copolymer). The white powder was dried at 120° C. for one day and night, and then melted in an extruder to be pelletized. The glass transition temperature (Tg) of the pellets was 152.6° C. The viscosity average molecular weight of the copolymer was 23,900. Determination by gel permeation chromatography shows that the molecular weight distribution of the copolymer was such that a single peak appeared at the above value.

According to a determination by NMR, the content of TBA (repeating unit (I)) in the main chain of the copolymer was found to be 3.1 mol %.

Subsequently, the pellet was injection-molded by an injection molder at a temperature of 300° C. under an injection pressure of 55 kg/cm² to obtain a test piece. The test piece was measured for Izod impact strength and flame retardance. The flow value of the pellet was measured by a Koka type flow tester.

The bromine content of the resulting pellet was 6.4% by weight. The bromine content was determined by alkali decomposing and analyzing the sample by the Volhard method.

The thermostability at molding was tested as follows. The pellet was injection-molded to be kept at 300° C. for 30 minutes, and thereafter a test piece was formed. The yellowness index (YI) of the resulting test piece was determined by a Transmission-type photometer. The results are shown in Tables 1 and 2.

PREPARATION EXAMPLES 2 AND 3

Preparation of PC-2,3

The procedure of Preparation Example 1 was repeated except that the aqueous solution of TBA and TBP in sodium hydroxide solution was altered as shown in Table 1. The results are shown in Table 2.

PREPARATION EXAMPLE 4

Preparation of PC-4

The procedure of Preparation Example 1 was repeated except that the aqueous solution of TBA and TBP in sodium hydroxide was altered as shown in Table 1. The results are shown in Table 2.

PREPARATION EXAMPLE 5

Preparation of PC-5

The procedure of Preparation Example 1 was repeated except that the aqueous solution of TBA and TBP in sodium hydroxide was altered as shown in Table 1. The results are shown in Table 2.

TABLE 1

| | Amount of Each Component in Aqueous Solution of TBA and TBP in Sodium Hydroxide (g) | | | | | |
|---|---|---|---|---|---|---|
| | TBA | BPS | TDP | TBP | PTBP | NaOH |
| Preparation Example 1 | 250 | — | — | 150 | — | 78.6 |
| Preparation Example 2 | 391 | — | — | 150 | — | 102.4 |
| Preparation Example 3 | 247 | — | — | 179 | — | 85.0 |
| Preparation Example 4 | 180 | 74 | — | 179 | — | 109.2 |
| Preparation Example 5 | 180 | — | 161 | 179 | — | 162.3 |

TABLE 2

| | Composition of Copolymer in the Main Chain (mol %) | | | | TBP Content (mol %) | Total Bromine Content *3 (wt %) |
|---|---|---|---|---|---|---|
| | BPA | TBA | BPS | TDP | | |
| Preparation Example 1 | 96.9 | 3.1 | 0 | 0 | 3.0 | 6.4 |
| Preparation Example 2 | 95.1 | 4.9 | 0 | 0 | 2.9 | 8.4 |
| Preparation Example 3 | 96.7 | 3.3 | 0 | 0 | 3.8 | 7.3 |
| Preparation Example 4 | 95.5 | 2.4 | 2.1 | 0 | 3.9 | 6.4 |
| Preparation Example 5 | 92.3 | 2.5 | 0 | 5.2 | 3.8 | 6.5 |

| | Viscosity Average Molecular Weight *2 | Flow Value *3 (ml/sec) | Izod Impact Strength *4 (kg-cm/cm) |
|---|---|---|---|
| Preparation Example 1 | 23,900 | $2.4 \times 10^{-2}$ | 88 |
| Preparation Example 2 | 23,700 | $2.6 \times 10^{-2}$ | 57 |
| Preparation Example 3 | 19,300 | $6.3 \times 10^{-2}$ | 54 |
| Preparation Example 4 | 19,300 | $5.6 \times 10^{-2}$ | 52 |
| Preparation Example 5 | 19,700 | $5.9 \times 10^{-2}$ | 72 |

| | Flame Retardance *5 (1/16") | Thermostability at Molding *6 (YI) |
|---|---|---|
| Preparation Example 1 | V-0 | 8 |
| Preparation Example 2 | V-0 | 9 |
| Preparation Example 3 | V-0 | 10 |
| Preparation Example 4 | V-0 | 10 |
| Preparation Example 5 | V-0 | 9 |

EXAMPLES 1 TO 12 AND COMPARATIVE EXAMPLES 1 TO 3

Polycarbonate, polyamide resin and other additives in prescribed amounts were premixed in a drum tumbler, introduced to an extruder to be kneaded at 270° C., and pelletized. The resulting pellets were dried at 120° C. for 12 hours, and injection-molded at a molding temperature of 270° C. and a die temperature of 80° C. to obtain a test piece. The resulting test piece was determined for tensile strength, solvent resistance, flow value and flame retardance. The results are shown in Table 3.

TABLE 3

| | Polycarbonate | | Polyamide Resin | | Other Additives | |
|---|---|---|---|---|---|---|
| | Kind | Ratio | Kind | Ratio | Kind | Ratio |
| Example 1 | PC-1 | 90 | PA-6 | 10 | — | — |
| Example 2 | PC-2 | 90 | PA-6 | 10 | — | — |
| Example 3 | PC-3 | 90 | PA-6 | 10 | — | — |
| Example 4 | PC-4 | 90 | PA-6 | 10 | — | — |
| Example 5 | PC-5 | 90 | PA-6 | 10 | — | — |
| Example 6 | PC-1 | 70 | PA-6 | 30 | — | — |
| Example 7 | PC-2 | 50 | PA-6 | 50 | — | — |
| Example 8 | PC-1 | 80 | PA-66 | 20 | — | — |
| Example 9 | PC-2 | 70 | PA-66 | 30 | — | — |
| Example 10 | PC-1 | 70 | PA-6 | 30 | GF | 10 |
| Example 11 | PC-2 | 95 | PA-66 | 5 | Lubricant | 0.5 |
| Example 12 | PC-1 | 60 | PA-6 | 40 | Flame Retardant | 5 |
| Comparative Example 1 | PC-6 | 100 | — | — | — | — |
| Comparative | PC-1 | 100 | — | — | — | — |

TABLE 3-continued

| | | | | | |
|---|---|---|---|---|---|
| Example 2 Comparative Example 3 | PC-6 | 70 | PA-6 | 30 | — — |

| | Evaluation | | | |
|---|---|---|---|---|
| | Tensile Strength (kg/cm$^2$) | Solvent Resistance | Flow Value (ml/sec) | Flame Retardance |
| Example 1 | 680 | 0.4 | 12 × 10$^{-2}$ | V-0 |
| Example 2 | 680 | 0.4 | 12 × 10$^{-2}$ | V-0 |
| Example 3 | 690 | 0.4 | 13 × 10$^{-2}$ | V-0 |
| Example 4 | 690 | 0.4 | 15 × 10$^{-2}$ | V-0 |
| Example 5 | 690 | 0.4 | 15 × 10$^{-2}$ | V-0 |
| Example 6 | 710 | 0.8 | 21 × 10$^{-2}$ | V-2 |
| Example 7 | 730 | 1< | 25 × 10$^{-2}$ | V-2 |
| Example 8 | 690 | 0.6 | 15 × 10$^{-2}$ | V-0 |
| Example 9 | 720 | 0.8 | 17 × 10$^{-2}$ | V-0 |
| Example 10 | 1220 | 0.8 | 12 × 10$^{-2}$ | V-0 |
| Example 11 | 710 | 0.4 | 13 × 10$^{-2}$ | V-0 |
| Example 12 | 730 | 1< | 18 × 10$^{-2}$ | V-0 |
| Comparative Example 1 | 650 | 0.2 | 7 × 10$^{-2}$ | V-2 |
| Comparative Example 2 | 660 | 0.2 | 2.4 × 10$^{-2}$ | V-0 |
| Comparative Example 3 | 680 | 0.8 | 14 × 10$^{-2}$ | HB |

Notes:
(1) Kind of Polycarbonate
PC-1~PC-5: Each polycarbonate prepared in Preparation Examples 1 to 5
PC-6: Toughlon A-2200 (polycarbonate produced from bisphenol A) produced by Idemitsu Petrochemical Co., Ltd.
(2) Kind of Polyamide Resin
PA-6: UBE Nylon 1013B produced by Ube Industries, Ltd.
PA-66: UBE Nylon 2020B produced by Ube Industries, Ltd.
(3) Other Additives
GF: 03MA409C, produced by Asahi Fiber Glass Co., Ltd. (diameter : 13 μm, length : 3 mm)
Lubricant: Rikemal S100A produced by Riken Vitamin Co., Ltd. (stearic acid monoglyceride)
Flame Retarder: BC-58 produced by Great Lakes Ltd. (TBA oligomer)
(4) Test Methods
Tensile Strength: Measured according to JIS K-7113.
Flow Value: Measured according to JIS K-7210. (temperature : 280° C., load : 160 kg/cm$^2$)
Flame Retardance: Measured according to UL-94 (1/16 inch in thickness)
Solvent Resistance: Determined by critical strain in ratio by volume, in a solvent (ratio of composition: toluene/isooctane = 40/60), according to the ¼ oval method described in Nakatsuji et al. "Shikizai" vol. 39, page 455 (1966).
(5) Proportions of Components
The proportions of polycarbonate and polyamide resin to be compounded are indicated by percentage (% by weight) based on the total amounts of them, and the proportions of other additives are shown by parts by weight based on the total amount of polycarbonate and polyamide resin as 100 parts.

EXAMPLES 13 TO 21 AND COMPARATIVE EXAMPLES 4 to 7

Polycarbonate and thermoplastic polyester were premixed in a drum tumbler, and the resulting mixture was introduced to an extruder, kneaded at 270° C. to be pelletized. Further, the resulting pellets were dried at 120° C. for 12 hours, and then injection-molded at a die temperature of 80° C. for obtain a test piece. The resulting test piece was determined for tensile strength, solvent resistance, flow value and flame retardance. The results are shown in Table 4.

TABLE 4

| | Polycarbonate | | Thermoplastic Polyester | |
|---|---|---|---|---|
| | Kind | Ratio | Kind | Ratio |
| Example 13 | PC-1 | 70 | PET | 30 |
| Example 14 | PC-2 | 70 | PET | 30 |
| Example 15 | PC-3 | 70 | PET | 30 |
| Example 16 | PC-4 | 70 | PET | 30 |
| Example 17 | PC-5 | 70 | PET | 30 |
| Example 18 | PC-1 | 90 | PET | 10 |
| Example 19 | PC-1 | 50 | PET | 50 |
| Example 20 | PC-1 | 80 | PBT | 20 |
| Example 21 | PC-1 | 60 | PBT | 40 |
| Comparative Example 4 | PC-6 | 100 | — | — |
| Comparative Example 5 | PC-1 | 100 | — | — |
| Comparative Example 6 | PC-6 | 70 | PET | 30 |
| Comparative Example 7 | PC-6 | 80 | PBT | 20 |

| | Evaluation | | | |
|---|---|---|---|---|
| | Tensile Strength (kg/cm$^2$) | Solvent Resistance | Flow Value (ml/sec) | Flame Retardance |
| Example 13 | 620 | 0.5 | 12 × 10$^{-2}$ | V-0 |
| Example 14 | 625 | 0.5 | 12 × 10$^{-2}$ | V-0 |
| Example 15 | 620 | 0.5 | 14 × 10$^{-2}$ | V-0 |
| Example 16 | 620 | 0.5 | 15 × 10$^{-2}$ | V-0 |
| Example 17 | 620 | 0.5 | 15 × 10$^{-2}$ | V-0 |
| Example 18 | 635 | 0.4 | 15 × 10$^{-2}$ | V-0 |
| Example 19 | 615 | 0.6 | 17 × 10$^{-2}$ | HB |
| Example 20 | 650 | 0.5 | 14 × 10$^{-2}$ | V-0 |
| Example 21 | 670 | 0.6 | 22 × 10$^{-2}$ | HB |
| Comparative Example 4 | 650 | 0.2 | 7 × 10$^{-2}$ | V-2 |
| Comparative Example 5 | 660 | 0.2 | 2.4 × 10$^{-2}$ | V-0 |
| Comparative Example 6 | 620 | 0.5 | 10 × 10$^{-2}$ | HB |
| Comparative Example 7 | 640 | 0.4 | 11 × 10$^{-2}$ | HB |

(1) Kind of polycarbonate : As described before
(2) Kind of Thermoplastic Polyester PET (polyethylene terephthalate : DIANITE MA 523 produced by Mitsubishi Rayon Co., Ltd. (intrinsic viscosity: 0.72 dl/g)
PBT (polybutylene terephthalate) : DURANEX 2002 produced by Polyplastics Co., Ltd. (intrinsic viscosity: 1.06 dl/g)
(3) Test Method : As described before
(4) Proportions of Components
The proportions of polycarbonate and thermoplastic polyester are indicated by percentage (% by weight) based on the total amount of them.

EXAMPLES 22 TO 35 AND COMPARATIVE EXAMPLES 8 TO 10

Polycarbonate, polyolefin and other additives each in prescribed amount were premixed in a drum tumbler, and the resulting mixture was introduced into an extruder, kneaded at 280° C. to be pelletized. The resulting pellets were injection-molded at a molding temperature of 280° C. and a die temperature of 80° C. to obtain a test piece. The test piece obtained was determined for tensile strength, solvent resistance, flame retardance and flow value. The results are shown in Table 5.

TABLE 5

| | Polycarbonate | | Polyolefin | | Other Additives | |
|---|---|---|---|---|---|---|
| | Kind | Ratio | Kind | Ratio | Kind | Ratio |
| Example 22 | PC-1 | 90 | HDPE | 10 | — | — |
| Example 23 | PC-2 | 90 | HDPE | 10 | — | — |
| Example 24 | PC-3 | 90 | HDPE | 10 | — | — |
| Example 25 | PC-4 | 90 | HDPE | 10 | — | — |
| Example 26 | PC-5 | 90 | HDPE | 10 | — | — |
| Example 27 | PC-1 | 80 | HDPE | 20 | — | — |
| Example 28 | PC-1 | 70 | HDPE | 30 | — | — |
| Example 29 | PC-1 | 95 | PP | 5 | — | — |
| Example 30 | PC-2 | 80 | PP | 20 | — | — |
| Example 31 | PC-1 | 90 | LLDPE | 10 | GF | 10 |
| Example 32 | PC-1 | 80 | LLDPE | 20 | Lubricant | 0.5 |
| Example 33 | PC-3 | 85 | HDPE | 15 | Flame Retardant | 5 |
| Example 34 | PC-1 | 95 | LLDPE | 5 | — | — |
| Example 35 | PC-1 | 80 | PP | 20 | — | — |
| Comparative Example 8 | PC-1 | 100 | — | — | — | — |
| Comparative Example 9 | PC-6 | 100 | — | — | — | — |

TABLE 5-continued

| | | | | | | |
|---|---|---|---|---|---|---|
| Comparative Example 10 | PC-6 | 30 | PP | 70 | — | — |

| | Evaluation | | | |
|---|---|---|---|---|
| | Tensile Strength (kg/cm$^2$) | Solvent Resistance | Flow Value (ml/sec) | Flame Retardance |
| Example 22 | 570 | 0.4 | 14 × 10$^{-2}$ | V-0 |
| Example 23 | 560 | 0.4 | 14 × 10$^{-2}$ | V-0 |
| Example 24 | 550 | 0.4 | 16 × 10$^{-2}$ | V-0 |
| Example 25 | 560 | 0.4 | 17 × 10$^{-2}$ | V-0 |
| Example 26 | 550 | 0.4 | 17 × 10$^{-2}$ | V-0 |
| Example 27 | 520 | 0.7 | 20 × 10$^{-2}$ | V-2 |
| Example 28 | 490 | 1< | 22 × 10$^{-2}$ | V-2 |
| Example 29 | 600 | 0.4 | 18 × 10$^{-2}$ | V-0 |
| Example 30 | 550 | 0.8 | 25 × 10$^{-2}$ | V-2 |
| Example 31 | 500 | 0.5 | 19 × 10$^{-2}$ | V-0 |
| Example 32 | 470 | 0.6 | 22 × 10$^{-2}$ | V-2 |
| Example 33 | 1000 | 0.6 | 12 × 10$^{-2}$ | V-0 |
| Example 34 | 530 | 0.5 | 22 × 10$^{-2}$ | V-0 |
| Example 35 | 520 | 0.8 | 23 × 10$^{-2}$ | V-0 |
| Comparative Example 8 | 660 | 0.2 | 2.4 × 10$^{-2}$ | V-0 |
| Comparative Example 9 | 650 | 0.2 | 7 × 10$^{-2}$ | V-2 |
| Comparative Example 10 | 420 | 1< | 65 × 10$^{-2}$ | HB |

Notes:
(1) Kind of polycarbonates : As described above
(2) Kind of polyolefins
HDPE : Idemitsu Polyethylene 640 UF produced by Idemitsu Petrochemical Co., Ltd.
PP : Idemitsu Polypro E100G produced by Idemitsu Petrochemical Co., Ltd.
LLDPE : Idemitsu Polyethylene L D134H produced by Idemitsu Petrochemical Co., Ltd.
(3) Other Additives
GF : MA409C produced by Asahi Fiber Glass Co., Ltd. (glass fiber having a diameter of 13 μm and a length of 3 mm)
Lubricant : Rikemal S100A produced by Riken Vitamin Co., Ltd. (stearic acid monoglyceride)
Flame Retarder : BC-58 produced by Great Lakes Co. (TBA oligomer)
(4) Test Method : As described before.
(5) Proportions of Components The proportions of polycarbonate and polyolefin to be compounded are indicated by percentage (% by weight) based on the total amount of them, and the proportions of the other additives are indicated by parts by weight based on the total amount of polycarbonate and polyolefin as 100 parts by weight.

Industrial Availability

As described above, the polycarbonate resin composition of the present invention is greatly improved in fluidity and solvent resistance while maintaining mechanical properties and moldability compared with the composition obtained by blending polyamide resin, thermoplastic polyester or polyolefin with a conventional polycarbonate. Moreover, the resin composition of the present invention is also excellent in heat resistance and flame retardance.

Consequently, the polycarbonate resin composition of the present invention is effectively used as the material for various moldings such as parts of automobiles, home electric appliances, and office automation appliances.

We claim:

1. A polycarbonate resin composition which comprises (a) 70 to 95% by weight of a polycarbonate having a main chain, the polycarbonate comprising a repeating unit (I) represented by the formula (A):

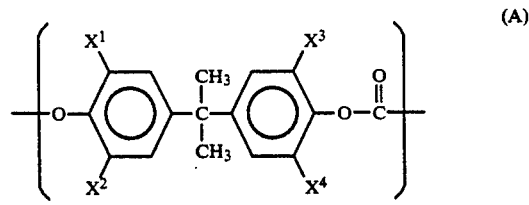

wherein $X^1$ to $X^4$ indicates independently a halogen atom, a repeating unit (II) represented by the formula (B):

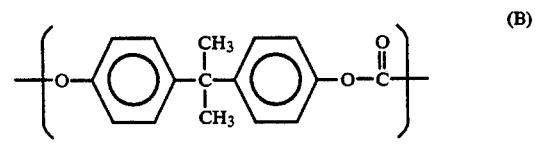

and, at the terminals thereof, a trihalogenophenoxy group represented by the formula (C):

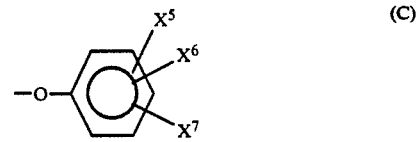

wherein $X^5$ to $X^7$ indicate independently a halogen atom, the polycarbonate having a viscosity average molecular weight of 10,000 to 50,000 and the repeating unit (I) being contained in the main chain in an amount of 1 to 10 mol %, and (b) 30 to 5% by weight of a polyolefin.

2. The polycarbonate resin composition as defined in claim 1, wherein repeating unit (I) is containing in said main chain in an amount of 2 to 6 mol %.

3. The polycarbonate resin composition as defined in claim 1, wherein the polycarbonate further comprises 0 to 20 mol % of thiodiphenol or bisphenolsulfone.

4. The polycarbonate resin composition as defined in claim 2, wherein the polycarbonate has a viscosity average molecular weight of 13,000 to 50,000 and $X^1$ to $X^4$ are identical and are selected from the group consisting of bromine, chlorine and fluorine.

5. The polycarbonate resin composition as defined in claim 1, wherein the polyolefin is a homopolymer of an alpha-olefin selected from the group consisting of ethylene, propylene, butene-1, isobutene-1, pentene-1, 3-methybutene-1, 4-methylpentene-1, hexene-1, octene-1, or a copolymer containing two or more of said alpha-olefins.

6. The polycarbonate resin composition as defined in claim 1, wherein the polyolefin is selected from the group consisting of low density polyethylene, high density polyethylene, isotactic polypropylene, atactic polypropylene, ethylene-propylene copolymer, ethylene-vinyl acetate copolymer, ethylene-methyl acrylate copolymer, ethylene-ethyl acrylate copolymer and ethylene-methyl methacrylate copolymer.

* * * * *